Oct. 9, 1962    L. W. PARMATER ET AL    3,058,062
COMPOSITE ELECTRICAL TEST INSTRUMENTS
Filed Nov. 20, 1958    2 Sheets-Sheet 1
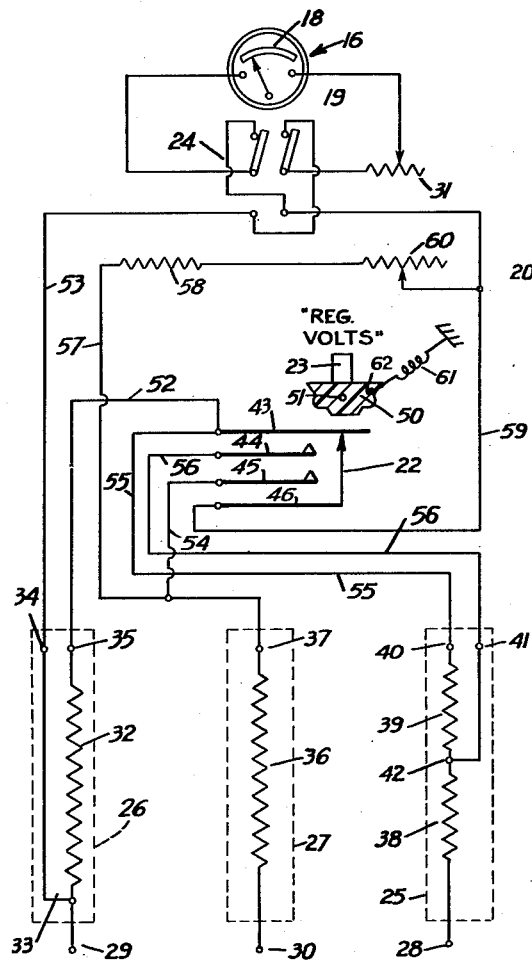
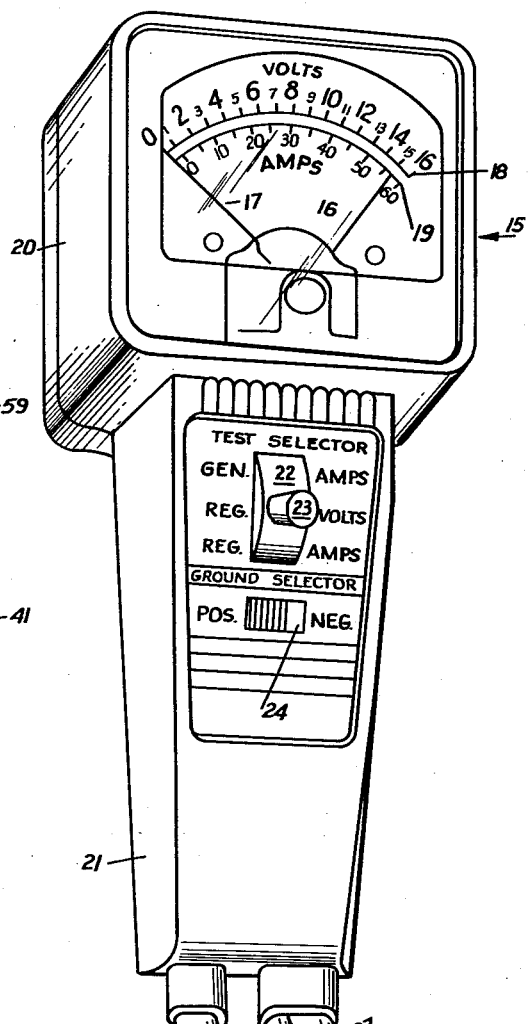
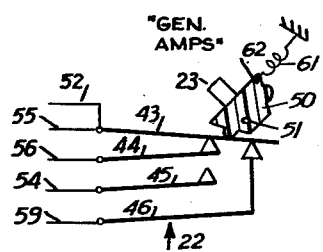
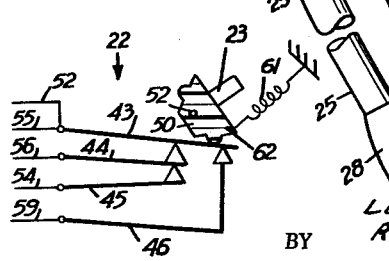
INVENTORS
LEE W. PARMATER
ROBERT M. CAIN
BY
Ostrolenk, Faber,
Gerb & Soffen
ATTORNEYS

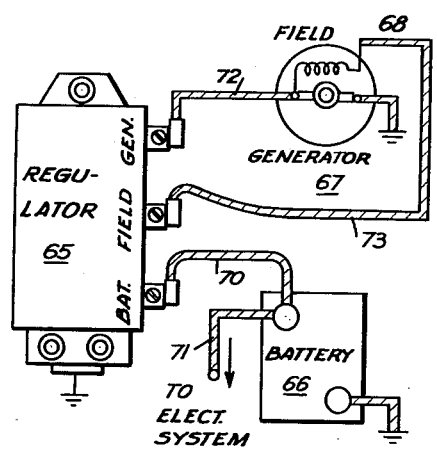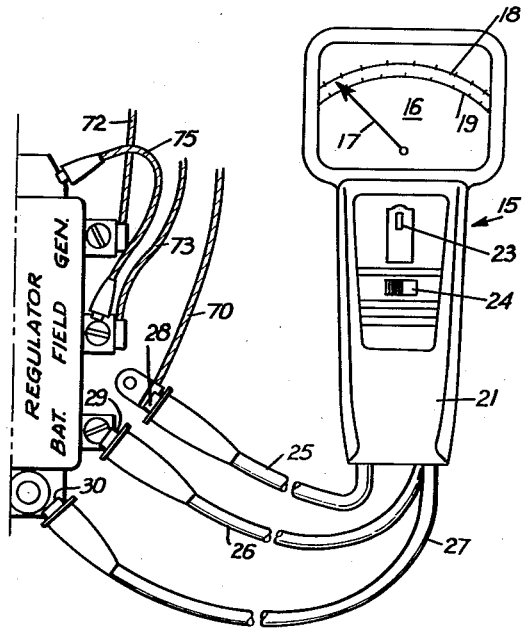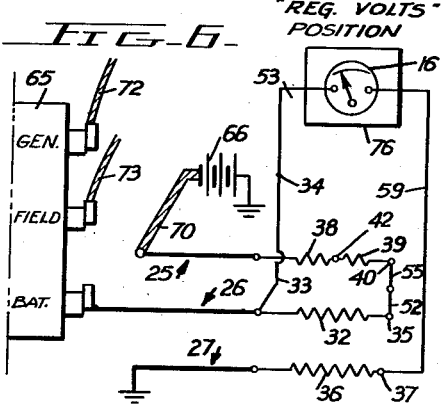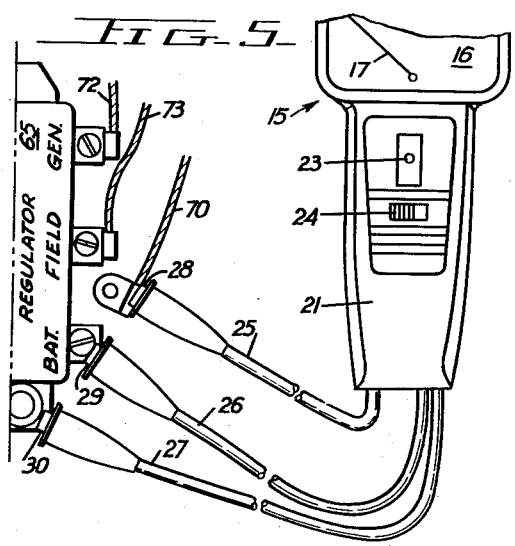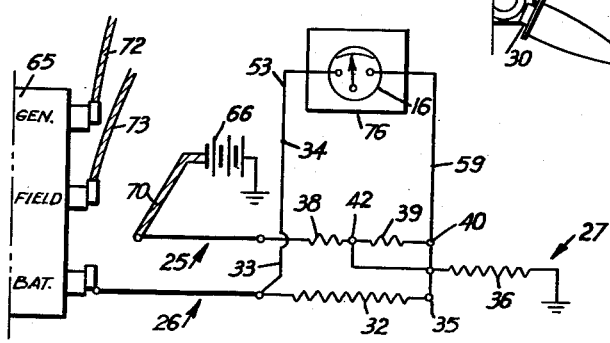

United States Patent Office 3,058,062
Patented Oct. 9, 1962

3,058,062
COMPOSITE ELECTRICAL TEST INSTRUMENTS
Lee W. Parmater, 10131 Riverview Drive, and Robert M. Cain, 3932 Canterbury Drive, both of Kalamazoo, Mich.
Filed Nov. 20, 1958, Ser. No. 775,270
2 Claims. (Cl. 324—73)

This invention relates to composite electrical test instruments, and more particularly relates to novel compact, one-hand operated instruments for testing the low voltage system of automobiles including the regulator, generator and battery.

Heretofore such electrical testers as used in the automotive garage have been difficult to use and were bulky, and expensive. The difficulty of use was due to the number of switches and knobs, the multiplicity of meter scales, the number of leads to connects, and the variations in these connections for various tests. One of the contributing factors for the bulk in the prior tester units heretofore stems from the fact that in order to test a current regulator, it is necessary to load the battery with a resistive load. This resistance serves to partially discharge the battery so that the current regulator will be called upon to operate, thereby permitting the test to be made. A great deal of heat is dissipated in this resistance, and even in a bulky box the amount of heat is such that the ensuing dissipation from the box is not always sufficient to prevent damage to components of the instrument, and plastic meter cases.

In accordance with the present invention, a novel compact hand-portable instrument is provided for readily and accurately performing all of the testing requisite for an automobile low voltage system. The invention instrument has a single meter with a dual scale, for both voltage and amperage measurements. It contains two thumb switches for directly arranging its internal circuitry to perform the specific tests. This single instrument is usable for all the tests for all makes of components and cars. It thus, in a practical relatively low-cost unit replaces prior bulky, complex and expensive devices for this purpose.

The invention tester incorporates the loading resistors, used in some of the tests, within the cables extending therefrom. Thus the heat from the resistors is dissipated over the entire length of these cables, and avoids the bulk and deterioration of prior testers. Operational complexity is overcome with a novel switch which permits the operator to make the necessary generator and regulator tests in one-two-three fashion, without having to alter the connections or think too closely. Regulator voltage setting is determined with the thumb control at the "Reg.-Volts" position. This switch position inserts a suitable resistive load (from the cables), between the battery and the regulator, to simulate a full battery charge. Thus there is no need to install a test battery for such test.

For the regulator current setting, the thumb control is arranged to be held down, in the "Reg.-Amps." position. This switch position inserts a load resistance (from the cables), in the battery circuit equivalent to turning on lights, etc. in the car. This holds down the voltage for accurate check of the current setting. A spring release is incorporated in the control to automatically prevent excessive battery discharge. The generator current output is directly determined with the thumb control at a third position, "Gen.-Amps.," in the invention tester. The tester is calibrated for both six and twelve volt systems, and is universal in application.

It is accordingly a primary object of the present invention to provide a novel hand-portable, thumb-operated universal test instrument for low voltage systems of automobiles and the like.

Another object of the present invention is to provide a novel test instrument for regulators, generators, and the like utilizing a single meter, together with simplified switching circuitry for the several operational modes.

A further object of the present invention is to provide a novel electrical instrument for testing and adjusting regulators and generators in automotive systems, incorporating load resistors within the instrument cables.

These and further objects of the present invention will become more apparent from the following description of an exemplary embodiment thereof, illustrated in the drawings, in which:

FIGURE 1 is a perspective illustration of the exemplary instrument tester.

FIGURE 2 is a schematic circuit diagram of the exemplary tester of FIGURE 1, in one of its operational modes.

FIGURES 2A and 2B are diagrams of two further modes of operation of the control switch of the tester of FIGURES 1 and 2.

FIGURE 3 is a circuit diagram of a typical low voltage system of an automobile.

FIGURE 4 is an operational diagram of the tester for one of its tests.

FIGURE 5 is an operational diagram of the tester use on a voltage regulator.

FIGURE 6 is a circuit diagram of the tester circuit as used in the tests of FIGURE 5, in the "Reg.-Volts" mode.

FIGURE 7 is a circuit diagram of the tester in a further operational mode, in the "Reg.-Amps." position.

The invention embodiment test instrument 15 is illustrated in perspective in FIGURE 1. Instrument 15 incorporates a single electrical meter 16 with pointer 17 for two scales; voltage scale 18, and amperage scale 19. Voltage scale 18 extends to 16 volts, to cover all practical voltage measurements for either the six or twelve volt battery systems. The ampere scale 19 extends to sixty amperes. The head 20 of tester 15 contains the meter 16. The body 21 of tester 15 is elongated for hand holding. The switches and circuit components of instrument 15, contained in body portion 21, are circuitally illustrated in FIGURE 2.

The selector or control switch 22 is thumb operated at three position knob 23. The upper position, "Gen.-Amps" connects the instrument circuit for testing the amperage of the car generator, as will be set forth. The middle position, "Reg.-Volts," moves the internal control switch to its circuit mode for testing the voltage setting of the car regulator. The lower position, "Reg.-Amps," arranges the meter circuit to determine the current setting of the regulator. These circuit modes are to be hereinafter described in detail. A spring return arrangement is provided at the "Reg.-Amps" position to avoid undue battery discharge by the inserted test resistors. The ground selector switch 24 adjusts the meter 16 polarity to the car system. Test cables 25, 26, 27 are individual, and contain linear load resistances for the testing modes to be set forth. Booted alligator-type clips 28, 29, 30 extend at the cable ends.

FIGURE 2 is a schematic diagram of the electrical circuit of the exemplary test instrument 15. The meter 16 is connected to the circuit through reversing switch 24. A rheostat 31 in series with meter 16 is used to calibrate for the ampere scale 19 readings. The three cables 25, 26, 27 include load resistances, suitably proportioned to accomplish the various circuital functions, to be described. The resistances thereof are linearly disposed along and within the cables 25, 26, 27 so as to uniformly dissipate heat generated therein.

Cable 26 contains resistor 32. Also, a conductor lead 33 connects from the cable end 29 on through cable 26 to terminal 34 thereof. Resistor 32 terminates at 35. Cable 27 comprises essentially a linear resistor 36 between clip 30 and terminal 37. Cable 25 is composed of two resistors 38, 39 in series between clip 28 and terminal 40. Intermediate tap 42 is conducted to terminal 41 of cable 25.

The selector or control switch 22 is a multi-blade unit, with four contact arms 43, 44, 45, 46. Thumb knob 23 actuates a control cam 50 pivoted at 51 and coactable with switch 22 to effectuate the test switching modes. Switch 22 and cam 50 are in the "Reg.-Volts" or regulator voltage test circuit modes corresponding to the central position of tester 15 in FIGURE 1. Terminal 35 of cable 26 connects to switch blade 43 through lead 52; terminal 34; through lead 53 to reversing switch 24. Terminal 37 of cable 27 connects to blade 45 through lead 54. Terminal 40 of cable 25 connects to switch blade 43 through lead 55. Terminal 41 of cable 25, through lead 56 connects to blade 45.

Lead 57 connects a dropping resistor 58 in the meter circuit, connecting to both blade 45 and cable terminal 37. Further, a calibrating rheostat 60 is in series with fixed resistor 58 and the reversing switch 24. Suitable pre-adjustment of rheostat 60 sets the voltage readings for scale 18 of meter 16. Lead 59 connects blade 46 to rheostat 60 and switch 24.

The thumb knob 23, in FIGURE 2, is in the "Reg.-Volts" central position. Switch 22 is unactuated in this connection mode. Blades 43, 44, 45, 46 remain unconnected. FIGURE 2A illustrates the "Gen.-Amps." position of switch 22 and cam 50 pressing thereagainst. In this mode blades 43, 44 and 46 are electrically interconnected to establish the instrument circuit accordingly. FIGURE 2B shows the "Reg.-Amps." position of switch 22 and cam 50, wherein all four blades are interconnected. A spring member 61 is shown coupled to cam 50 at its portion 62, and is arranged to automatically move cam 50 to the next adjacent position upon release of thumb pressure on knob 23. The circuit is thus not left inadvertently in a battery discharging condition which the "Reg.-Amps." mode entails.

FIGURE 3 is a diagrammatic circuit showing of a typical low voltage automobile electrical system, for which the tester 15 is used. Regulator 65 is of the three-unit type containing terminal "Bat." for the battery 66 connection; terminal "Field" for the generator field 68 connection; and terminal "Gen." for the generator 67 connection. The regulator 65 frame is grounded. Such regulators and their circuital interrelation and operation are well known in the art, and are not detailed herein. A regulator such as unit 65 contains a current regulator, a voltage regulator, and a cut-out relay.

The "Bat." terminal connects to battery 66 through conductor cable 70. The opposite terminal of battery 66 is grounded. A cable, as 71, conducts the composite electrical power of the system to the electrical network of the car. The "Gen." terminal connects to the armature output of generator 67 through conductor cable 72, the opposite armature lead being grounded. The "Field" terminal connects to the field winding 68 through conductor cable 73. Other comparable electrical system arrangements are of course used, and are understood to be accommodated and tested with invention testers hereof.

FIGURE 4 illustrates the connection of tester 15 for testing the output of the generator (67) of the electrical system. The purpose of the generator output test is to: (1) locate whether the generator or regulator is at fault when no charging rate is obtained; and (2) to be sure that the generator charging rate meets specifications before testing or adjusting the regulator.

The generator output test is made by removing battery cable 70 from the "Bat." terminal, as shown in FIGURE 4; connecting clip 28 of tester cable 25 to battery cable 70; connecting clip 29 of cable 26 to the regulator "Bat." terminal; and connecting clip 30 of cable 27 to regulator ground. Also, the "Field" terminal is grounded by jumper 75. The switch 22 is moved to the "Gen.-Amps." position by thumb knob 23. Grounding the field terminal enables a test to be made of just the generator without the regulator in the circuit.

If a charging rate is obtained by grounding the field but no reading is apparent with the ground jumper removed, then the regulator should be serviced or replaced. If no charging rate is obtained with the field grounded, the fault is generally in the generator. Low output with the field grounded can be due to a slipping fan belt or defective generator. The circuit arranged in the FIGURE 4 mode interconnects load resistors 38 and 32 in series between battery cable 70 and the "Bat." terminal; and connects the meter 16 in the ampere mode directly between the "Bat." terminal and ground through resistor 36 of grounded cable 27.

FIGURE 5 illustrates the connection of tester 15 with the electrical system, for the regulator (65) voltage test. The voltage regulator must be at operating temperature before any electrical settings are checked or adjusted. Operating temperature for voltage regulator checking and adjusting is reached after running the engine for 15 minutes at a speed of about 1800 r.p.m. with a charging rate of 1 to 10 amps., and the regulator cover in place.

The tester 15 in FIGURE 5 is connected as in FIGURE 4 with battery cable 70 removed and connected to cable 25, with no jumper 75 used. Cable 26 connects to the "Bat." terminal, cable 27 to ground. The charging rate will be automatically controlled to this amperage with the tester 15 connected into the charging circuit, the selector 23 on "Reg.-Volts" position, and no electrical load other than ignition turned on. At the end of 15 minutes, the generator 67 is cycled by stopping the engine, then started and increase speed to about 2000 r.p.m. voltage is read on volts scale 18. If voltage regulator adjustment is necessary, the engine is stopped after each adjustment, then started and readings at 2000 r.p.m. taken, with regulator cover in place.

FIGURE 6 is a schematic circuit diagram of the tester 15 in its connection mode of FIGURE 5. Essentially, in this "Reg.-Volts" mode the cable load resistors 38, 39 (of cable 25) and resistor 32 (of cable 26) are connected in series between battery 66 and the "Bat." terminal of regulator 65. In order to test a voltage regulator, it has been necessary that the battery be substantially full-charge. This is not always the case. The condition is herein simulated by inserting (automatically) a load resistance which permits the voltage regulator to operate. This loading condition also controls the charging rate for the aforesaid warm-up period. The voltage readings are made on meter 16 which connects to "Bat." terminal through cable 26 and conductor 33 thereof, and grounded cable 27 with series resistor 36. The meter 16 circuitry is diagrammatically indicated at 76.

Tester 15 is used to test the current regulator unit of the regulator 65. The tester 15 is connected into the battery-regulator circuit in the same manner as for the voltage regulator test as diagrammed in FIGURE 5. However, the thumb knob 23 is moved into the "Reg.-Amps." position and held down during the current measuring phase to be herein described. If the current regulator is not temperature compensated, the 15 minute warm up period for the voltage regulator test is all that is needed before checking or adjusting the current regulator.

The specifications furnished for temperature compensated current regulators are for a normal operating temperature. This can only be reached after 15 minutes of operation with the current regulator operating and the cover in place. The charging system voltage must be approximately one volt below the voltage regulator setting in order to keep the current regulator operating for 15 minutes. This requires that all the lights, radio, heater, etc. be turned on plus an additional load such as a carbon pile or bank of lights. No volt-amp. tester is designed to handle this particular test in this manner. However, generally speaking, if the temperature compensated current regulator is checked the same as one that is not compensated, and the reading is no more than 10% above the specifications, no adjustment is required.

With the thumb selector 23 held in "Reg.-Amps." position, the voltage of the charging circuit is kept low enough so that the voltage regulator will not operate, and the setting of the current regulator may be checked on the ampere scale 19. When the thumb knob 23 is released after the readings, the spring 61 (FIGURE 2B) automatically returns the control to the "Reg.-Volts" position so as not to unduly drain the battery 66.

FIGURE 7 is a schematic diagram of the tester 15 circuit in the "Reg.-Amps." mode for the current regulator testing per its connection to the battery-regulator system as in FIGURE 5. This corresponds to the control switch 22 being actuated by cam 50 as shown in FIGURE 2B. In this mode, load resistors 38 and 32 are in series connection between battery 66 and the regulator "Bat." terminal. Also, load resistor 36 connects to these resistors and to ground, as a load or bleeder for the aforesaid test purposes. The meter 16 network 76 is connected for the regulator ampere measurement, across resistor 32, as a shunt take-off.

To check the cut-out relay closing voltage, tester 15 is connected in its "Reg.-Volts" circuit mode, per FIGURES 2 and 6. It is quite important to test the closing voltage, particularly if the voltage setting of the voltage regulator has been reduced. The closing voltage must be at least half a volt less than the voltage regulator setting. If the cutout relay setting is higher than the setting of the voltage regulator, the points will not close and the generator will not charge.

To check the closing voltage of cutout relay of regulator 65, the following procedure is used:

(1) Set Ground Selector switch 24 to Neg. or Pos. position, depending upon which terminal of the battery is grounded.

(2) Move selector knob 23 to "Reg.-Volts."

(3) Connect clip 30 of cable 27 to regulator ground.

(4) Connect clip 29 of cable 26 to "Gen." terminal of regulator (the cable 25 is not used).

(5) Start engine and reduce idle speed to obtain no more than a 5 volt reading on 6-volt systems, 10 volt reading on 12 volt systems, on scale 18.

(6) Slowly increase speed and note voltage reading just before cutout points close, indicated by deflection of meter pointer 17.

If the closing voltage and the battery voltage are about the same, no pointer deflection will be noted and it is difficult to determine the cutout closing voltage. By turning on the lights, the battery voltage will be lowered enough so that a pointer deflection can be seen.

The opening amperage of the regulator cutout relay is also readily performed with tester 15. This test will apply where the specifications list the reverse current necessary to open the cutout points. It is possible to have the closing voltage adjusted correctly and still have the reverse current not meet specification, although in most cases it is only necessary to be sure that the cutout points open. The Ground Selector switch 24 permits reversing the ammeter reading without changing test leads.

The procedure is as follows for the opening amperage test:

(1) Disconnect the battery wire 70 from the regulator, as in FIGURE 5.

(2) Connect clip 28 to cable 25 to the battery wire 70 removed from the regulator (as shown in FIGURE 5).

(3) Connect clip 29 of cable 26 to the "Bat." terminal on the regulator, in the manner of FIGURE 5.

(4) Move selector knob 23 to "Gen.-Amps." mode. (The cable 27 is not used.)

(5) Start engine, increase speed to obtain an ampere reading of 20. If unable to obtain a 20 ampere reading, turn on lights and accessories.

(6) Slow engine to obtain zero reading on ampere scale 19. Move Ground Selector 24 to opposite polarity.

(7) Continue to decrease engine speed. Meter pointer will register discharge current on ampere scale 19 and then return to zero.

The tester 15 may be used as a straight volt-meter. This is arranged by using only the cables 26 and 27, with the control-knob 23 in the "Reg.-Volts" position of FIGURE 2. The reversing switch 24 is used for proper phasing. Tester 15 is used as a straight ammeter with the selector knob 23 in the "Gen.-Amps." position of FIGURE 2A. Cables 25 and 26 are used for this purpose.

Although we have described an exemplary embodiment for our invention tester, and various modes of its application, it is to be understood that modifications may be made therein and as to its uses that are encompassed in the broader spirit and scope of the invention, as set forth in the following claims.

We claim:

1. A hand portable electrical test instrument for a regulator of the character described, comprising a housing containing a meter having a multi-scale for indicating voltage and current readings, said housing having an elongated hand-grippable body portion, a multi-positionable thumb control switch mounted on said body portion, said switch having a handle with at least one stable position and having unstable positions, and means for biasing said handle to said stable position from an unstable position wherein manual movement of said handle to said unstable position followed by release of said handle is operative to automatically effect return of said handle to said stable position, test cables extending from said housing, circuit elements including resistors and circuit connections with said switch, said switch being operative to set up selected circuit conditions for current and voltage testing of electrical equipment, said circuit connections including said test cables, said test cables comprising resistances forming part of selective circuits as controlled by said switch and comprising load resistors linearly arranged within respective cables.

2. An instrument as set forth in claim 1, said cables being in spaced heat dissipating separated array.

References Cited in the file of this patent

UNITED STATES PATENTS

| | | |
|---|---|---|
| 2,232,341 | Pierce | Feb. 18, 1941 |
| 2,352,499 | Sears | June 27, 1944 |
| 2,680,834 | Burns | June 8, 1954 |
| 2,712,633 | Jameson | July 5, 1955 |
| 2,780,777 | Sammis | Feb. 5, 1957 |
| 2,883,619 | Kobbe | Apr. 21, 1959 |
| 2,927,270 | Wilton | Mar. 1, 1960 |